(12) United States Patent
Tsuzuki (10) Patent No.: US 8,861,103 B2
(45) Date of Patent: Oct. 14, 2014

(54) LENS DRIVING APPARATUS AND OPTICAL APPARATUS HAVING THE SAME

(75) Inventor: Masahiko Tsuzuki, Saitama (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 13/491,073

(22) Filed: Jun. 7, 2012

(65) Prior Publication Data

US 2012/0314311 A1    Dec. 13, 2012

(30) Foreign Application Priority Data

Jun. 7, 2011    (JP) .................. 2011-126894

(51) Int. Cl.
 G02B 7/02    (2006.01)
 G02B 7/10    (2006.01)

(52) U.S. Cl.
 CPC ...................................... G02B 7/102 (2013.01)
 USPC ........................... 359/823; 359/811; 359/819

(58) Field of Classification Search
 USPC ......... 359/811, 813, 815, 819–824, 694–696,
 359/703–704; 369/44.14–44.17, 112.2,
 369/112.23–112.26
 See application file for complete search history.

(56) References Cited

U.S. PATENT DOCUMENTS

| 7,312,937 | B2 | 12/2007 | Nishimoto |
|---|---|---|---|
| 7,800,850 | B2 | 9/2010 | Hasegawa |
| 8,300,331 | B2 * | 10/2012 | Kawamuki et al. ............ 359/819 |
| 8,320,065 | B2 * | 11/2012 | Dong ............................ 359/824 |
| 2007/0263300 | A1 | 11/2007 | Tengeiji et al. |

FOREIGN PATENT DOCUMENTS

| CN | 1924629 A | 3/2007 |
|---|---|---|
| CN | 101520537 A | 9/2009 |
| JP | 04-240609 A | 8/1992 |
| JP | 07-043580 A | 2/1995 |
| JP | 08-184742 A | 7/1996 |
| JP | 09-258087 A | 10/1997 |
| JP | 2009-042306 A | 2/2009 |
| JP | 2010-276635 A | 12/2010 |

OTHER PUBLICATIONS

Chinese Office Action issued in Counterpart Chinese Patent Application No. 20121081020.4 dated Jul. 3, 2014. English translation provided.

* cited by examiner

*Primary Examiner* — Thomas K Pham
*Assistant Examiner* — Brandi Thomas
(74) *Attorney, Agent, or Firm* — Rossi, Kimms & McDowell LLP (57) ABSTRACT

An apparatus includes a driver configured to rotate a lead screw, a rack unit including a mated portion mated with the lead screw, the rack unit being coupled with the holder and configured to move along the lead screw as the lead screw is rotated by the driver, a first elastic member configured to force the mated portion against the lead screw with a first force F1, an opposed cog arranged opposite to the mated portion with respect to the lead screw and displaceable relative to the mated portion, and a second elastic unit configured force the opposed cog unit with a second force F2 toward the lead screw. F1<F2<F3 is satisfied where a force containing F3 is a component that opposes to F2, at least one of the mated portion and the lead screw getting damaged when F3 is applied between the mated portion and the lead screw.

12 Claims, 5 Drawing Sheets

FIG. 5C

LENS DRIVING APPARATUS AND OPTICAL APPARATUS HAVING THE SAME

BACKGROUND OF THE INVENTION

1. Field of the Invention

The present invention relates to a lens driving apparatus and an optical apparatus having the same.

2. Description of the Related Art

One conventionally known driving unit for a focusing or zooming lens holding frame includes a motor having a lead screw, and a rack unit that is coupled with the lens holding frame, mated with the lead screw, and configured to move along the lead screw as the motor rotates.

Japanese Patent Laid-Open No. ("JP") 4-240609 discloses a configuration of a rack unit that includes two sub-units and is forced against a lead screw by a spring member.

JP 9-258087 discloses a rack unit that includes a mated portion, a forcing portion, and an opposed cog. The mated portion is arranged on one side of the lead screw, and the forcing portion is arranged on the other side. The mated portion is mated with the lead screw, and the fixed opposed cog is arranged on the opposite side of the mated portion and is offset in the optical-axis direction from the mated portion so as to prevent a cog skip (positional shift) upon impact. In addition, at an end of a movable range of the rack unit, an opposed cog is located at a non-threaded area of the lead screw so as to prevent cogging of the rack unit at the end of the movable range of the lens holding frame.

In the structure disclosed in JP 4-240609, the spring member must apply a considerable force in order to prevent a positional shift between the rack unit and the lead screw upon impact. Then, a load of the motor increases, a large and high-torque motor is required, and a larger size and an increased cost of the apparatus become problematic.

In the structure disclosed in JP 9-258087, a strong impact at the position other than the end of the movable range of the lens holding frame would cause a plastic deformation (cogging) between the mated portion and the lead screw, and at least one of the mated portion and the lead screw get damaged and become inoperable.

SUMMARY OF THE INVENTION

The present invention provides a lens driving apparatus and an optical apparatus having the same, which can prevent a positional shift and cogging between the rack unit and a lead screw.

The lens driving apparatus according to the present invention is configured to drive a holder configured to hold a lens, and includes a driver configured to rotate a lead screw, a rack unit including a mated portion mated with the lead screw, the rack unit being coupled with the holder and configured to move along the lead screw as the lead screw is rotated by the driver, a first elastic member configured to force the mated portion against the lead screw with a first force, an opposed cog arranged opposite to the mated portion with respect to the lead screw and displaceable relative to the mated portion, and a second elastic unit configured force the opposed cog unit with a second force toward the lead screw. The following conditional expression is satisfied $F1<F2<F3$, where F1 is the first force, F2 is the second force, and a force containing F3 is a component that opposes to F2, at least one of the mated portion and the lead screw getting damaged when F3 is applied between the mated portion and the lead screw.

Further features of the present invention will become apparent from the following description of exemplary embodiments with reference to the attached drawings.

DESCRIPTION OF THE EMBODIMENTS

Figure 1:
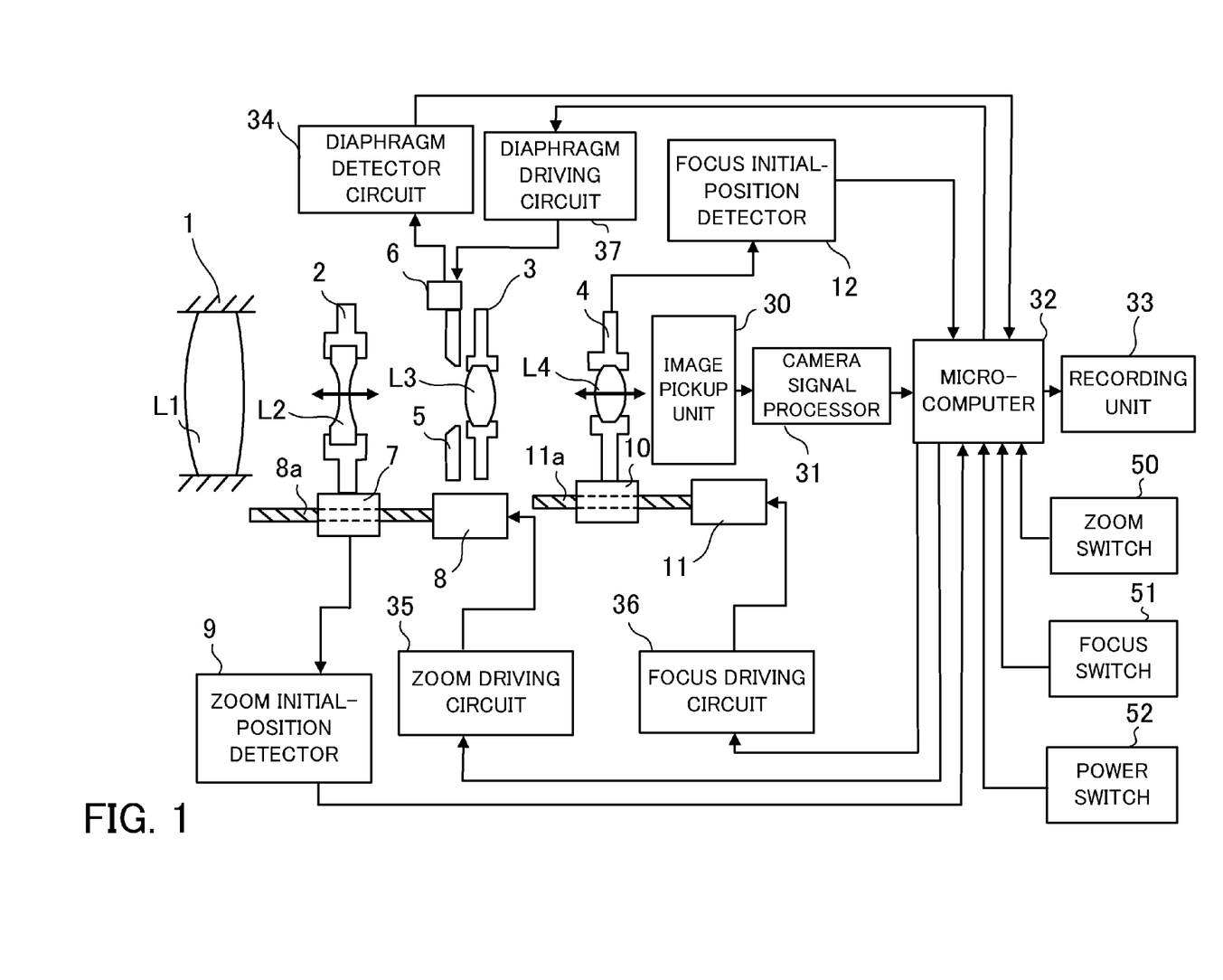
FIG. 1 is a block diagram of an image pickup apparatus (optical apparatus) according to this embodiment.

FIG. 1 is a block diagram of an image pickup apparatus (optical apparatus) according to this embodiment, such as a video camera and a digital still camera.

In FIG. 1, L1 is a first lens unit having a positive refractive power which is fixed during zooming. L2 is a second lens unit having a negative refractive power which serves as a zooming lens unit configured to move in an optical-axis direction during zooming. L3 is a third lens unit having a positive refractive power which is fixed. L4 is a fourth lens unit having a positive refractive power and configured to move in the optical-axis direction during focusing. The first lens unit L1 to the fourth lens unit L4 constitute an image pickup optical system configured to form an optical image of an object.

Reference numeral 1 denotes a front barrel configured to hold the first lens unit L1. Reference numeral 2 denotes a first holder (lens holding frame) configured to hold the second lens unit L2. Reference numeral 3 denotes a fixed unit configured to hold the third lens unit L3. Reference numeral 4 denotes a second holder (lens holding frame) configured to hold the fourth lens unit L4. The first holder 2 and the second holder 4 are supported so that they can move in the optical-axis direction of the image pickup optical system.

Reference numeral 5 denotes a diaphragm unit configured to change an aperture diameter of the optical system. This diaphragm unit 5 is a guillotine type diaphragm configured to change an aperture diameter by moving two diaphragm blades in opposite directions utilizing a driver 6.

An image pickup unit 30 includes, such as, an image pickup element (such as a CCD and a CMOS), a low-pass filter, and an infrared cutting filter, and is fixed in a back barrel (not illustrated). The image pickup unit 30 outputs an image pickup signal to a camera signal processor 31.

The camera signal processor 31 amplifies and gamma-corrects an output of the image pickup unit 30. A signal amplified and gamma-corrected by the camera signal processor 31 is output to the microcomputer 32.

The microcomputer 32 receives a multiplicity of signals, processes them, outputs a multiplicity of signals in accordance with an input signal, and controls the optical apparatus. Reference numeral 33 is a recording unit configured to record an image signal processed by the microcomputer 32, and a recording condition.

Reference numeral 34 denotes a diaphragm detector circuit configured to detect a rotating position of a driving magnet of the driver 6 utilizing a Hall element. The microcomputer 32 outputs a diaphragm driving signal to a diaphragm driving circuit so as to adjust the light quantity in accordance with an input signal, such as a rotating amount of the driver 6 from the diaphragm detector circuit 34 and an input signal from the camera signal processor 31.

Reference numeral 50 denotes a zoom switch configured to instruct zooming. Reference numeral 51 denotes a focus switch configured to instruct manual focusing (in-focus operation) made by a photographer. Reference numeral 52 denotes a power switch.

Figure 2A:
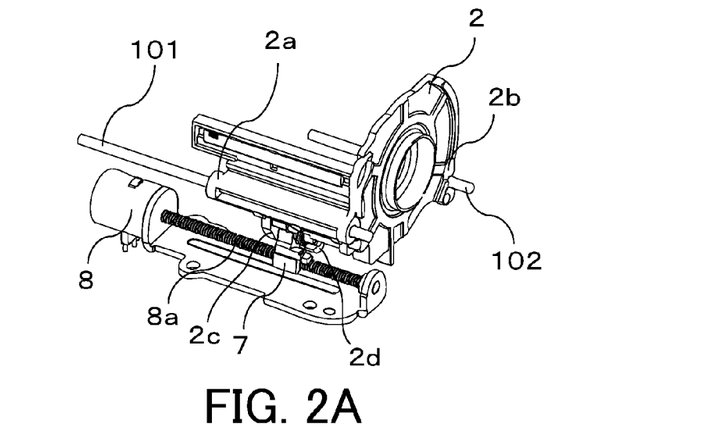
FIGS. 2A-2C are perspective views of a lens driving apparatus configured to drive a second lens unit illustrated in FIG. 1 viewed with different angles.
Figure 2B:
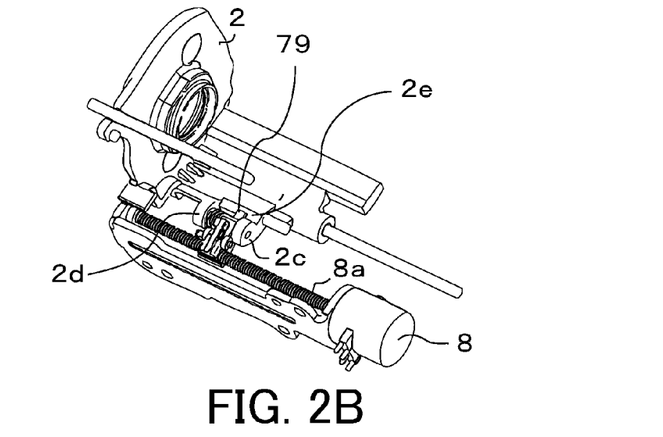
Figure 2C:
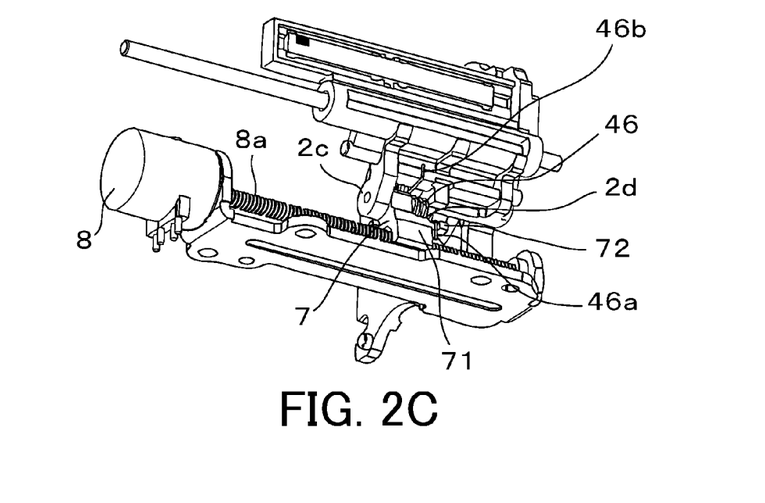
Figure 3:
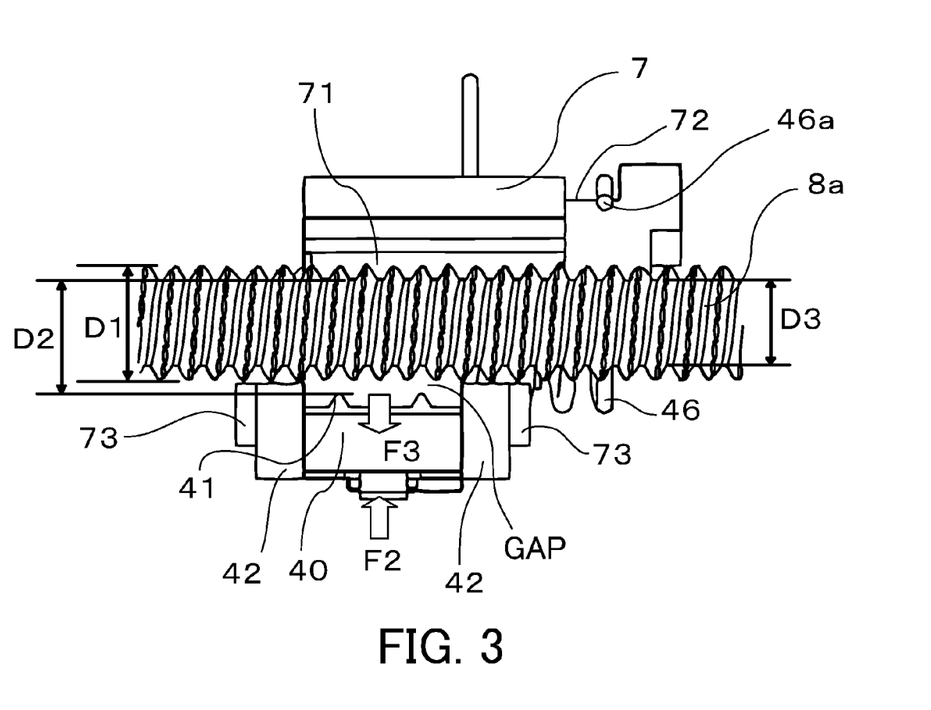
FIG. 3 is a partially enlarged plane view of the lens driving apparatus illustrated in FIGS. 2A-2C.

The first holder (lens holding frame) 2 is moved in the optical-axis direction by the lens driving apparatus. FIGS. 2A to 2C are perspective views of the lens driving apparatus configured to drive the first holder (lens holding frame) 2 viewed with different angles. FIG. 3 is a partially enlarged plane view of the lens driving apparatus.

Figure 4A:
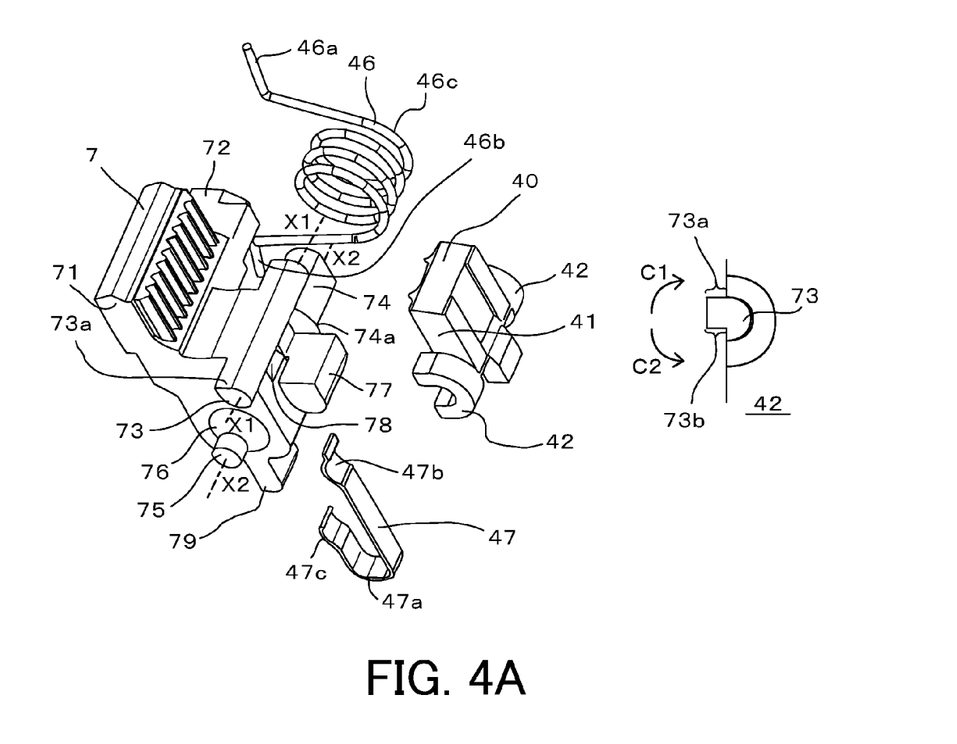
FIG. 4A is a partially exploded perspective view of the lens driving apparatus.
Figure 4B:
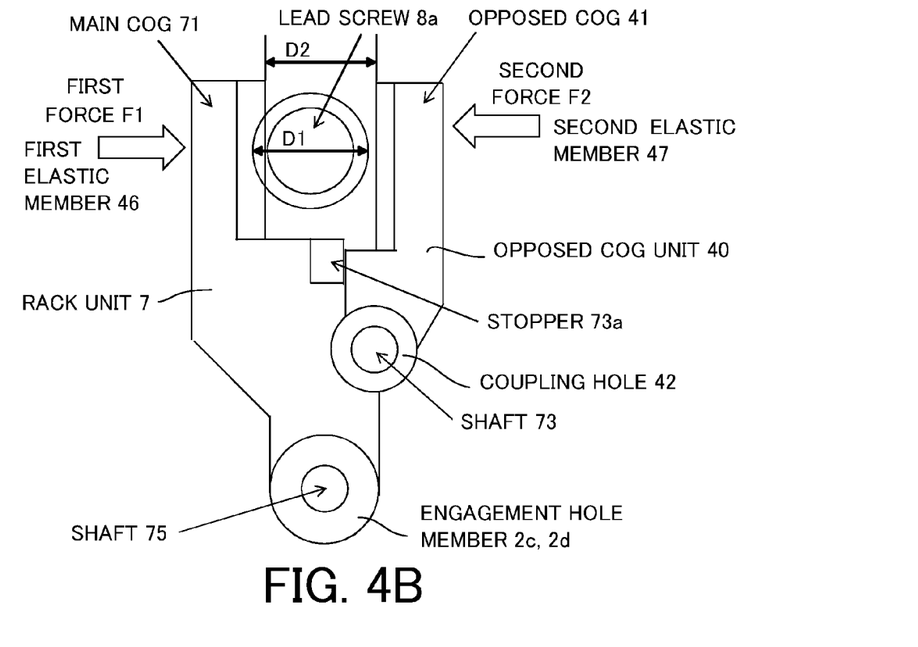
FIG. 4B is a schematic partially sectional view of the lens driving apparatus.
Figure 5A:
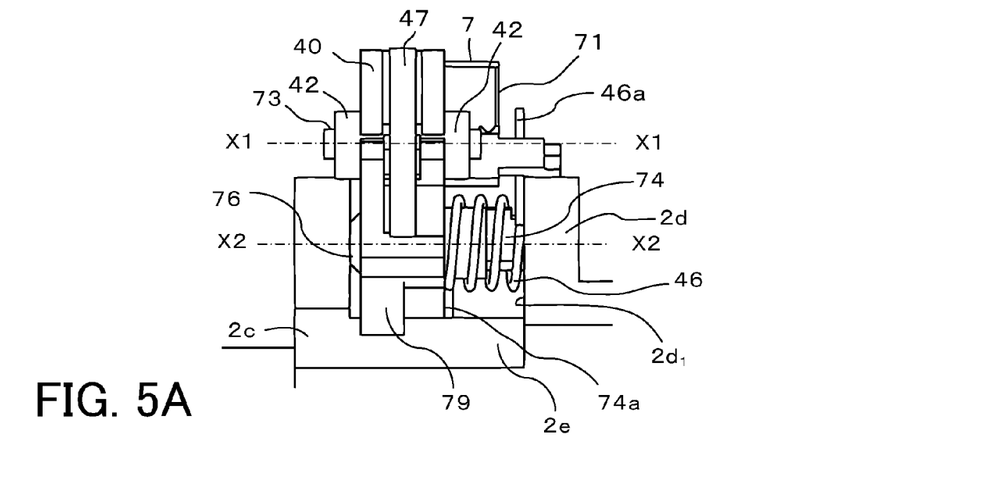
FIG. 5A is a partially plane view of the lens driving apparatus.

FIG. 4A is a partially exploded perspective view of the lens driving apparatus, where the lead screw 8a is omitted. FIG. 4B is a schematic partially sectional view of the lens driving apparatus. FIG. 5A is a partially plane view of the lens driving apparatus, viewed with a different angle from that of each of FIGS. 5B and 5C, where the lead screw 8a is omitted.

As illustrated in FIG. 2A, the first holder 2 is supported by a pair of guide bars 101, 102 that extend parallel to the optical-axis direction so that the first holder 2 can be moved in the optical-axis direction of the image pickup optical system. In addition, the first holder 2 includes, as illustrated in FIGS. 2A to 2C and 5A, a sleeve unit 2a, a rotation-stop recess 2b, a pair of engagement hole members 2c, 2d, and a stopper 2e.

The lens driving apparatus includes a rack unit 7, a zoom motor 8, a lead screw 8a, an opposed cog unit 40, a torsion coil spring (first elastic member) 46, a spring member (second elastic member) 47.

The rack unit 7 is coupled, as illustrated in FIG. 1, with the first holder 2, and includes a main cog (mated portion) 71, a stopper 72, an shaft 73, a spring holder 74, an shaft 75, a tapered portion 76, an engagement portion 77, a stopping hole 78, a rotation stopper 79.

As illustrated in FIGS. 3 and 4A, the main cog serves as a mated portion that can be mated or engaged with the threaded portion of the lead screw 8a.

The stopper 72 is recessed and engaged with one end 46a of the torsion coil spring 46 at the bottom of the recess, and the torsion coil spring 46 applies the force F1 as illustrated in FIG. 4B. As a result, the force F1 normally presses the main cog 71 of the rack unit 7 against the lead screw 8a. The first elastic member is not limited to the torsion coil spring.

The zoom motor 8 is an actuator (driver) configured to move the second lens unit L2 in the optical-axis direction for zooming, and is driven by a driving signal from the zoom driving circuit 35.

The lead screw 8a is mated with the rack unit 7, and the first holder 2 is moved in the optical-axis direction as the zoom motor 8 rotates. The lead screw 8a is concentric with a rotor of the zoom motor 8, and rotated by the zoom motor 8. The lead screw 8a is arranged so that its longitudinal direction is parallel to the optical axis of the image pickup optical system (or second lens unit L2). As illustrated in FIG. 3, D1 denotes the outermost diameter of the lead screw 8 (which is a diameter of a thread tip), and D3 is the innermost diameter (which is a diameter of the deepest point (bottom) in the groove).

The shaft 73 is engaged rotatably with the opposed cog unit 40, and serves as a rotating shaft of the opposed cog unit 40. The shaft 73 has a sectional shape that combines a rectangle and a partially projecting semicircle.

The opposed cog unit 40 includes an opposed cog 41 configured to prevent cog skip upon disturbance impact, such as a drop, and a pair of engagement hole members 42 engaged rotatably with the shaft 73.

As illustrated in FIGS. 3 and 4B, the main cog 71 and the opposed cog 41 are opposite to each other with respect to the lead screw 8a. As described later, since the main cog unit 40 is attached rotatably to the rack unit 7, an interval between the main cog 71 and the opposed cog 41 is made variable.

As schematically illustrated in FIG. 4B, the ridges of the main cog 71 and the opposed cog 41 are parallel to each other. As illustrated in FIGS. 3 and 4B, the main cog 71 normally contacts the lead screw 8a whereas the opposed cog does not normally contact or is separated from the lead screw 8a (or there is a gap as illustrated in FIG. 3). The opposed cog 41 is configured to contact the thread of the lead screw 8a only when the main cog 71 goes across the thread.

When a load applies upon impact of a fall, etc. to the rack unit 7 in the optical-axis direction so as to separate the main cog 71 from the lead screw 8a, the opposed cog 41 becomes mated with the lead screw 8a and prevents a positional shift caused by the cog skip.

Herein, D2 denotes a distance between a thread tip of the main cog 71 and a thread tip of the opposed cog 41. At this time, the following conditional expression is satisfied. The expression 1 can prevent a positional shift between the main cog 71 and the lead screw 8a with a simple structure:

$$D3 \leq D2 < D1 \tag{1}$$

A pair of engagement hole members 42 are provided at both sides of the opposed cog 41, have U-shaped sections, and are engaged with the shaft 73 so that the engagement hole members 42 can be rotated around a centerline of the shaft 73 or an X1-X1 axis approximately parallel to the optical axis illustrated in FIG. 4A.

Where the shaft 73 of the rack unit 7 is fixed, as illustrated in the right side of FIG. 4A, a stopper 73a of the shaft 73 prevents the opposed cog unit 40 having the engagement hole members 42 from rotating in a counterclockwise direction C2, and the opposed cog unit 40 is allowed to rotate only in the clockwise direction C1. Since the stopper 73a is planar, its structure is simple. On the right side of FIG. 4A, the stopper 73a is perpendicular to the end surface of the engagement hole member 42 on the rack unit side, but the stopper 73a may be upwardly inclined in the clockwise direction C1.

Thus, the stopper 73a prevents the opposed cog 41 from displacing in a direction approaching to the lead screw 8a (and the main cog 71), and permits the opposed cog 41 to displace in a direction separating from the lead screw 8a (and the main cog 71). As a result, the distance D2 is normally maintained constant.

In addition, a recessed stopper 73b of the shaft 73 contacts the engagement hole members 42 and prevents the opposed cog unit 40 from rotating by larger than a predetermined angle in the clockwise direction C1.

Figure 5B:
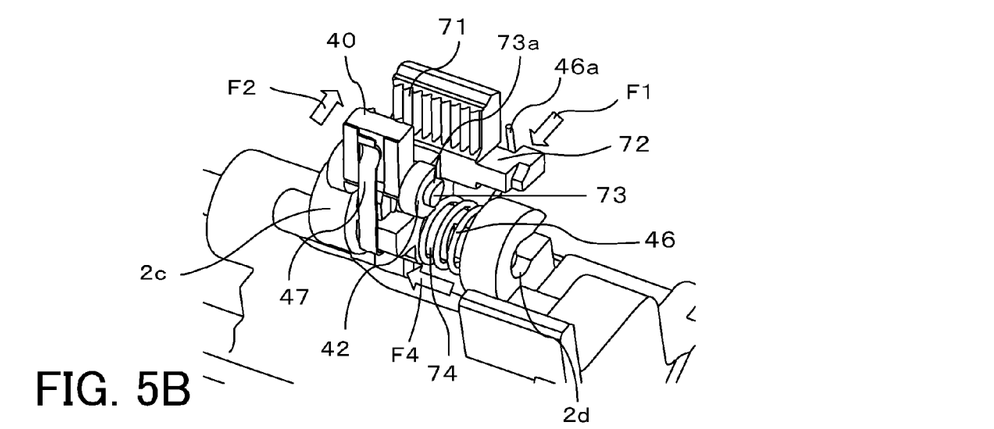
FIGS. 5B and 5C are partially perspective views of the lens driving apparatus viewed with different angles.

The spring holder 74 is a projection that is inserted into a hollow 46c of the torsion coil spring so as to hold the torsion coil spring 46, and configured to project in the optical-axis direction from an end surface 74a of the rack unit 7. The one end 46a of the torsion coil spring 46 is engaged with the stopper 72, and the other end 46b is engaged with a stopper 2e of the first holder 2. As a result, the torsion coil spring 46 applies the force F1 as illustrated in FIG. 5B.

The spring portion of the torsion coil spring into which the spring holder 74 is inserted also serves as a compression spring. As illustrated in FIG. 5A, this spring portion is engaged with the end surface 74a of the rack unit 7 at one end thereof and with the end $2d_1$ in the engagement hole member $2d$ of the first holder 2 (on the side of the rack unit 7) at the other end thereof. As a result, as illustrated in FIG. 5B, the torsion coil spring 46 includes a spring portion that applies a force F4 between the rack unit 7 and the first holder 2. The torsion coil spring 46 applying two forces F1 and F4 achieves multiple functions, and realizes the miniaturization and the cost reduction in comparison with providing two springs that apply these forces separately.

A pair of shafts 75 are cylindrical projections engaged rotatably with the engagement hole members 2c, 2d of the first holder 2, and thereby the rack unit 7 is coupled with the first holder 2. The centerline of the shaft 75 is an X2-X2 axis that is parallel to the X1-X1 axis, and located on the other side of the main cog 71 with respect to the X1-X1 axis. One of the pair of shafts 75 is provided on the end of the spring holder 74.

The shaft 75 located on the opposite side of the spring holder 74 has the tapered portion 76. As illustrated in FIG. 5B, the force F4 of the torsion coil spring 46 forces the tapered portion 76 against the engagement hole member 2c in the optical-axis direction, and enables the first holder 2 to stably move with the rack unit 7 in the optical-axis direction.

In addition, the opposed cog unit 40 is engaged with a spring member 47 that serves as a flat spring having a J-shaped section. The spring member 47 includes an engagement groove 47a, a forcing portion 47b, and a stopping portion 47c. The spring member 47 may be another elastic member, such as a wire spring or a torsion spring.

Figure 5C:
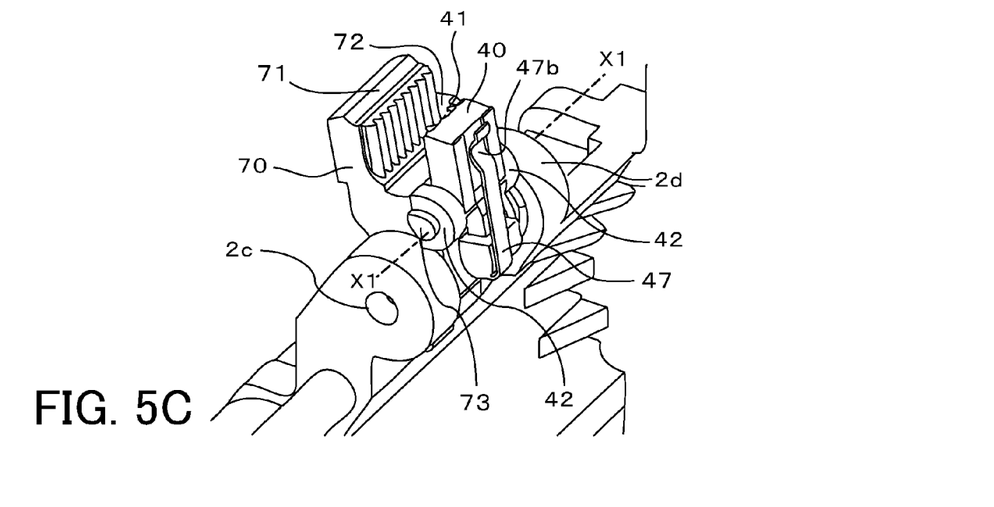

An engagement unit 77 is a projection that is provided under the shaft 73 illustrated in FIG. 4A (on the opposite side of the main cog 71), and projects to the inside (or towards the opposed cog unit 40). The bottom illustrated in FIG. 4A of the engagement member is arranged in the engagement groove 47a of the spring member 47, and the stopping portion 47c is inserted into and fixed in the engagement hole 78. The forcing portion 47b contacts the back surface of the opposed cog 41 as illustrated in FIGS. 5B and 5C, and applies a (second) force F2 to the opposed cog 41 towards the lead screw 8a.

The (second) force F2 of the spring member 47 forces the opposed cog 41 to the side of the lead screw 8a (in the counterclockwise direction C2 on the right side of FIG. 4A), but its rotation is prohibited by the stopper 73a. In other words, the opposed cog 41 is forced against the stopper 73a by the force F2. As described above, the opposed cog 41 is normally spaced from the lead screw 8a.

Herein, the following expression 2 is a conditional expression to prevent a positional shift and cogging between the main cog 71 of the rack unit 7 and the lead screw 8a. Since the second force F2 applied by the second elastic member is larger than the first force F1 applied by the first elastic member to the main cog 71, the cog skip (positional shift) can be prevented upon strong impact. In addition, the second force F2 is set smaller than a force F3. The force F3 is a component that opposes to the force F2 and a force containing F3 causes at least one of the main cog 71 and the lead screw 8a to get damaged when the force F3 is applied between the main cog 71 and the lead screw 8a. As a result, the opposed cog unit 40 rotates in a direction separating from the rack unit 7 (or the opposed cog 41 displaces in a direction separating from the main cog 71), and can prevent cogging of the rack unit 7.

$$0 < F1 < F2 < F3 \qquad (2)$$

The rotation stopper 79 has a thin rectangular plate shape, and is provided to the end opposite to the main cog 71 as illustrated in FIGS. 2B, 4A, and 5A, so that it can contact the stopper 2e of the first holder 2.

In the provisional assembly of the first holder 2, the rack unit 7 is forced around the X2-X2 axis by the force F1 of the torsion coil spring 46, and the rotation stopper 79 of the rack unit 7 is brought into contact with the stopper 2e.

When the zoom motor 8 is incorporated, the main cog 71 is mated with the lead screw 8a, the rotation stopper 79 of the rack unit 7 is separated from the stopper 2e, and the main cog 71 is forced against the lead screw 8a by the force F1.

Due to the strong impact force of a fall, when a force F3 that occurs in a direction separating the opposed cog 41 from the lead screw 8a exceeds the force F2 as illustrated in FIG. 3, the opposed cog unit 40 is separated from the lead screw 8a around the X1-X1 axis. Thereby, damages and cogging of the opposed cog 41 and the main cog 71 are prevented.

Reference numeral 9 denotes a photo-interrupter as a zoom initial-position detector. The photo-interrupter 9 electrically detects switching between shielding and transmitting of the light as a light shield (not illustrated) formed on the first holder 2 moves in the optical-axis direction, and detects a reference position of the first holder 2 in the optical-axis direction.

When the power switch 52 is turned on, the zoom motor 8 receives the driving signal from the zoom driving circuit 35 in accordance with the signal from the microcomputer 32, the photo-interrupter 9 detects the initial position of the first holder 2, and the first holder 2 moves to the predetermined initial position and stands by there. The zoom motor 8 is driven from the initial position by the number of steps corresponding to a manipulation of the zoom switch 50. In other words, when the zoom switch 50 is manipulated, the microcomputer 32 determines a moving direction designated by the manipulation, and performs zooming.

Reference numeral 11 denotes an actuator (driver) configured to move the fourth lens unit L4 in the optical-axis direction for focusing. The focus motor 11 is driven by the driving signal from the focus driving circuit 36.

The second holder 4 is also supported by the pair of guide bars 101, 102 that extend parallel to the optical-axis direction so that the second holder 4 can be moved in the optical-axis direction of the image pickup optical system. The second holder 4 is configured similar to the first holder 2, and the second holder 4 is also moved in the optical-axis direction by a lens driving apparatus that is similar to that for the first holder 2.

The lead screw 11a is mated with a rack unit 10 that is provided to the second holder 4 that can be moved and guided in the optical-axis direction. As the focus motor 11 rotates, the second holder 4 moves in the optical-axis direction. The lead screw 11a is arranged concentric to a rotor of the focus motor 11 and parallel to the optical axis of the image pickup optical system (or the fourth lens unit L4).

Reference numeral 12 denotes a photo-interrupter as a focus initial-position detector. The photo-interrupter 12 electrically detects switching between shielding and transmitting of the light as a light shield (not illustrated) formed on the second holder 4 moves in the optical-axis direction, and detects a reference position of the second holder 4 in the optical-axis direction.

When the power switch 52 is turned on, the focus motor 11 receives the driving signal from the focus driving circuit 36 in accordance with the signal from the microcomputer 32, the photo-interrupter 12 detects the initial position of the second holder 4, and the second holder 4 moves to the predetermined initial position and stands by there. The focus motor 11 is driven from the initial position by the number of steps corresponding to manipulations of the zoom switch 50 and the focus switch 51. In autofocusing, the focus driving circuit 36 electrifies the focus motor 11 in accordance with the input signal from the microcomputer 32 and drives the fourth lens unit L4 in the optical-axis direction.

In this embodiment, the rack unit 7 and the opposed cog unit 40 are separate units, and the opposed cog unit 40 is attached to the rack unit 7 so that the opposed cog unit 40 can rotate around the shaft 73. Alternatively, the rack unit 7 and the opposed cog unit may be integrated with each other and have a U-shaped section as a whole, and a part corresponding to the opposed cog unit 40 may be displace relative to a part corresponding to the rack unit 7 through an elastic deformation.

This embodiment can prevent a positional shift (cog skip) between the main cog 71 and the lead screw 8*a* since the second force F2 is larger than the first force F1. In addition, since the second force F2 is smaller than the force F3, cogging between the main cog 71 and the lead screw 8*a* can be prevented and damages at least one of the main cog 71 and the lead screw 8*a* can be prevented.

The lens driving apparatus of this embodiment can be used to move a lens holding frame or a holder other than the zooming lens holding frame and the focusing lens holding frame. The optical apparatus of this embodiment can be a portable digital camera, etc. which is likely to receive an impact of a fall, and thus a configuration of this embodiment is effective. However, a non-portable electronic apparatus is also subject to an impact by an earthquake, etc. Therefore, the optical apparatus of this embodiment is not limited to the portable electronic apparatus, and is broadly applicable to a driving (or moving) apparatus of an object.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-126894, filed Jun. 7, 2011, which is hereby incorporated by reference herein in its entirety.

What is claimed is:

1. A lens driving apparatus configured to drive a holder configured to hold a lens, the lens driving apparatus comprising:
   a driver configured to rotate a lead screw;
   a rack unit including a mated portion mated with the lead screw, the rack unit being coupled with the holder and configured to move along the lead screw as the lead screw is rotated by the driver;
   a first elastic member configured to force the mated portion against the lead screw with a first force;
   an opposed cog unit arranged opposite to the mated portion with respect to the lead screw and displaceable relative to the mated portion; and
   a second elastic unit configured to force the opposed cog unit with a second force toward the lead screw,
   wherein the following conditional expression is satisfied:

$$F1<F2$$

where F1 is the first force and F2 is the second force.

2. The lens driving apparatus according to claim 1, wherein the opposed cog unit is a separate member from the rack unit, and configured to be rotatable relative to the rack unit.

3. The lens driving apparatus according to claim 1, wherein:
   the mated portion normally contacts the lead screw with the first force applied by the first elastic member, and
   the opposed cog unit does not normally contact the lead screw and contacts the lead screw when the mated portion goes across a thread of the lead screw.

4. The lens driving apparatus according to claim 1, wherein the rack unit further includes a stopper configured to prevent the opposed cog unit from displacing in a direction approaching to the lead screw, and to permit the opposed cog to displace in a direction separating from the lead screw.

5. The lens driving apparatus according to claim 1, wherein the following conditional expression is further satisfied:

$$D3 \leq D2 < D1,$$

where D1 is a diameter of a thread tip of the lead screw, D2 is a normal distance between a thread tip of the mated portion and a thread tip of the opposed cog unit, and D3 is a diameter of a bottom of a groove of the lead screw.

6. The lens driving apparatus according to claim 1, wherein:
   the rack unit is engaged with the holder along an axis parallel to the lead screw, and
   the first elastic member is a torsion coil spring having a spring portion arranged around the axis parallel to the lead screw and configured to apply a force between the rack unit and the holder.

7. The lens driving apparatus according to claim 2, wherein:
   the opposed cog unit further includes a engagement hole member having a U-shaped section, and
   the rack unit further includes a shaft engaged rotatably with the engagement hole member, and a planar stopper provided to the shaft and configured to project from the engagement hole member when the engagement hole member is engaged with the shaft and to restrict a rotation of the opposed cog unit.

8. An optical apparatus comprising:
   a holder configured to hold a lens; and
   a lens driving apparatus configured to drive the holder,
   wherein the lens driving apparatus includes:
   a driver configured to rotate a lead screw;
   a rack unit including a mated portion mated with the lead screw, the rack unit being coupled with the holder and configured to move along the lead screw as the lead screw is rotated by the driver;
   a first elastic member configured to force the mated portion against the lead screw with a first force;
   an opposed cog unit arranged opposite to the mated portion with respect to the lead screw and displaceable relative to the mated portion; and
   a second elastic unit configured to force the opposed cog unit with a second force toward the lead screw,
   wherein the following conditional expression is satisfied:

$$F1<F2,$$

where F1 is the first force and F2 is the second force.

9. A lens driving apparatus configured to drive a holder configured to hold a lens, the lens driving apparatus comprising:
   a driver configured to rotate a lead screw;
   a rack unit including a mated portion mated with the lead screw, the rack unit being coupled with the holder and configured to move along the lead screw as the lead screw is rotated by the driver;
   a first elastic member configured to force the mated portion against the lead screw;
   an opposed cog unit arranged opposite to the mated portion with respect to the lead screw and displaceable relative to the mated portion; and a second elastic unit configured to force the opposed cog unit toward the lead screw, wherein the mated portion normally contacts the lead screw, and wherein the opposed cog unit does not normally contact the lead screw and mates with the lead screw when a load applies to the rack unit in a longitudinal direction of the lead screw to separate the rack unit from the lead screw.

10. The lens driving apparatus according to claim 9, wherein:

the second elastic unit forces the opposed cog unit toward the lead screw with a predetermined force, and the opposed cog unit separates from the lead screw when a force that occurs in a direction separating the opposed cog unit from the lead screw exceeds the predetermined force.

11. A lens driving apparatus configured to drive a holder configured to hold a lens, the lens driving apparatus comprising:

a driver configured to rotate a lead screw;

a rack unit including a mated portion mated with the lead screw, the rack unit being coupled with the holder and configured to move along the lead screw as the lead screw is rotated by the driver;

a first elastic member configured to force the mated portion against the lead screw;

an opposed cog unit arranged opposite to the mated portion with respect to the lead screw and displaceable relative to the mated portion; and a second elastic unit configured to force the opposed cog unit toward the lead screw, wherein the mated portion normally contacts the lead screw, and wherein the opposed cog unit does not normally contact the lead screw and mates with the lead screw when the mated portion goes across a thread of the lead screw.

12. The lens driving apparatus according to claim 11, wherein:

the second elastic unit forces the opposed cog unit toward the lead screw with a predetermined force, and the opposed cog unit separates from the lead screw when a force that occurs in a direction separating the opposed cog unit from the lead screw exceeds the predetermined force.

* * * * *